E. F. WAGNER AND G. H. LAWRENCE.
SHAFT COUPLING.
APPLICATION FILED OCT. 1, 1918.
1,321,264.
Patented Nov. 11, 1919.
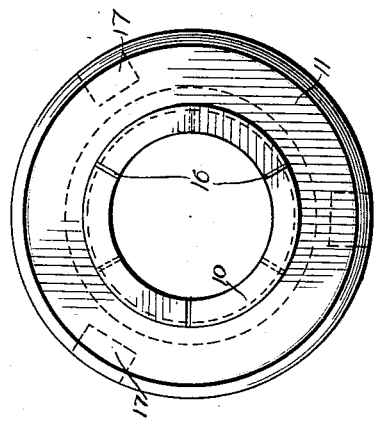
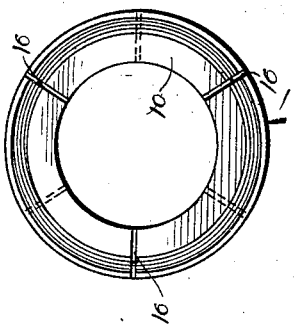
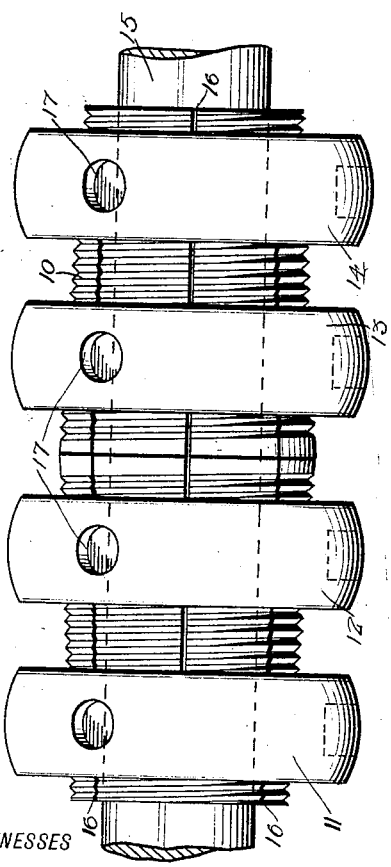
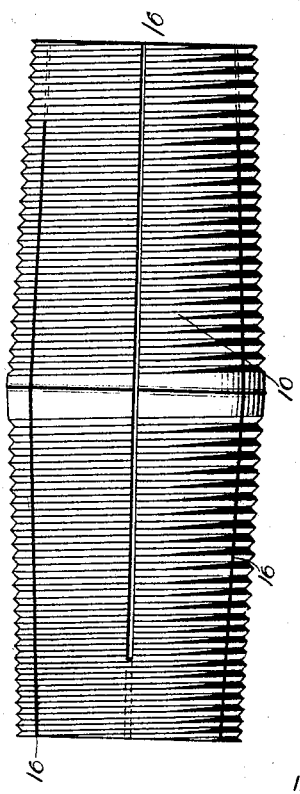
WITNESSES
L. M. Hawkins
INVENTOR
G. H. Lawrence & E. F. Wagner.
BY Munn & Co
ATTORNEYS

UNITED STATES PATENT OFFICE.

ERWIN FRANK WAGNER AND GEORGE HARNISH LAWRENCE, OF OWENSBORO, KENTUCKY.

SHAFT-COUPLING.

1,321,264. Specification of Letters Patent. Patented Nov. 11, 1919.

Application filed October 1, 1918. Serial No. 256,389.

*To all whom it may concern:*

Be it known that we, ERWIN FRANK WAGNER and GEORGE HARNISH LAWRENCE, citizens of the United States, and residents of Owensboro, in the county of Daviess and State of Kentucky, have invented a new and useful Improvement in Shaft-Couplings, of which the following is a specification.

Our present invention relates generally to couplings, and more particularly to shaft couplings, our object being the provision of a coupling acting by compression, as well as one which will be simple, durable, readily applicable in and removable from, operative position, and one which will be effective and efficient.

In the accompanying drawing, illustrating our invention,

Figure 1 is a side view showing the coupling applied,

Fig. 2 is an end view of the coupling removed, and

Figs. 3 and 4 are respectively a side and end view of the bushing.

Referring now to these figures, our invention comprises a compression bushing 10 and and a series of internally threaded rings 11, 12, 13 and 14, the bore of the rings 11 and 14 being similar in size and reduced with respect to the similar sizes of bores of rings 12 and 13.

The bushing 10 has an internal bore which is normally of slightly greater diameter than that of the shaft 15 whose sections are to be coupled, and is reduced in thickness from its center to its opposite ends, the external tapering surfaces being threaded as seen, to fit the threaded bores of the rings 11, 12, 13 and 14. Moreover, the bushing 10 has longitudinal slots 16 at spaced points therearound, which extend for the major portion of its length and alternately from opposite ends thereof, each slot terminating short of one end of the bushing so that the latter remains in one piece with the capacity of reduction in diameter when the rings are screwed tightly thereon.

The tapered and threaded bores of the rings 11, 12, 13 and 14 being of the different diameters above mentioned, take positions at the spaced points on the tapered and threaded bushing as seen in Fig. 1, and are each provided with radial, outwardly opening apertures 17 adapting the same to receive a spanner wrench and the like by means of which they may be tightened or loosened. This structure obviates all projections, bolt heads, nuts and other parts likely to catch into the clothes and cause accidents in use, is susceptible of speedy placement and removal, and will connect shaft sections rigidly and in such manner as to enable it to run smoothly and true.

In applying the coupling, the rings 11, 12, 13 and 14 are first loosened until the bushing can be slipped onto one shaft section, after which it is moved in the opposite direction onto the other shaft section until the joint is at the center of the bushing. The rings are then turned to compress the bushing and enable the latter to rigidly grip the shaft sections and the coupling is complete. In removing the coupling, this operation is simply reversed.

We claim:—

A shaft coupling consisting of a cylindrical bushing oppositely tapered from its center to its opposite ends along even gradual lines, and provided with external threads on its taper, and with longitudinal slots extending for the major portion therethrough and from its relative opposite ends in staggered relation therearound, each slot terminating at its inner end in spaced relation to one end of the bushing, and a pair of compression rings on each of the tapered portions of the bushing, each of which rings is internally threaded to engage the threads of the bushing and the rings of each pair of which are bored to seat upon their respective threaded portion of the bushing at longitudinally spaced points.

ERWIN FRANK WAGNER.
GEORGE HARNISH LAWRENCE.

Copies of this patent may be obtained for five cents each, by addressing the "Commissioner of Patents, Washington, D. C."